Nov. 21, 1944.                R. P. MATTERN                2,363,075
                      TEMPERATURE RESPONSIVE DEVICE
                            Filed May 9, 1942

INVENTOR.
RAYMOND P. MATTERN
BY
George H. Fisher
ATTORNEY

Patented Nov. 21, 1944

2,363,075

UNITED STATES PATENT OFFICE 2,363,075

TEMPERATURE RESPONSIVE DEVICE

Raymond P. Mattern, Minneapolis, Minn., assignor to Minneapolis-Honeywell Regulator Company, Minneapolis, Minn., a corporation of Delaware Application May 9, 1942, Serial No. 442,312

15 Claims. (Cl. 201—63)

This invention relates to temperature responsive measuring and/or control apparatus in general and more particularly to a device for varying an electrical quantity in accordance with temperature.

An object of the present invention is to construct an improved temperature responsive device of the type which includes an electrical resistance element of a material having an appreciable temperature coefficient of resistance.

Another object of the present invention is to construct an improved supporting and housing arrangement for a temperature responsive resistance element. A further object is to construct an improved electrical terminal connection for a temperature responsive resistance element.

A further object of the invention is to provide an improved device for measuring the temperature in a location where the device may be subjected to sudden extremes of temperature, widely variant moisture conditions, and intense vibration. A still further object is to provide an improved device for measuring the temperature of an internal combustion engine, especially adapted for use on aircraft.

Figure 1:
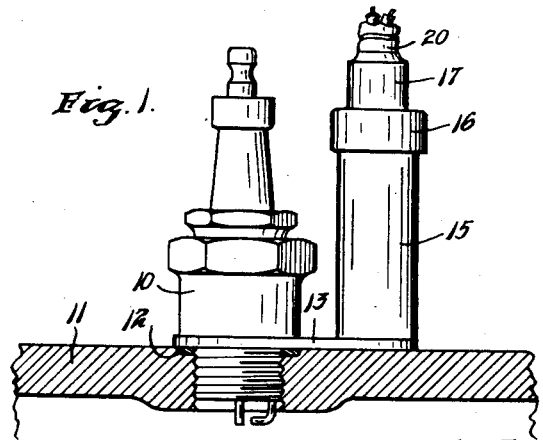
Figure 3:
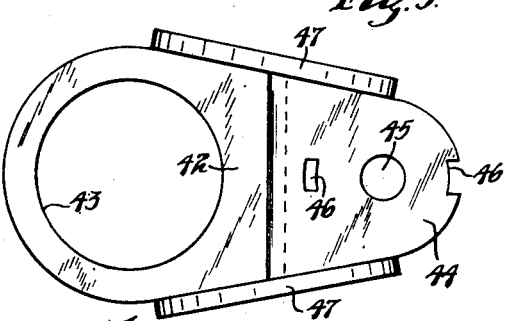
Figure 4:
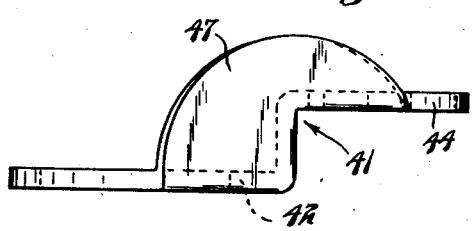
Figure 5:
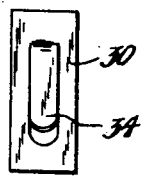
Figure 2:
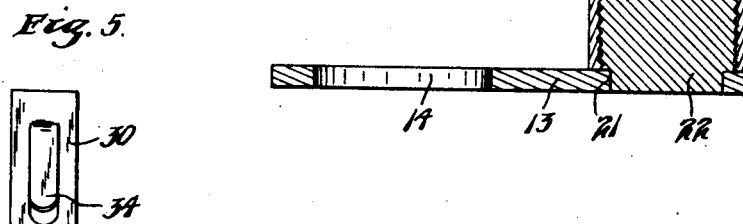

Other objects and advantages of the present invention will become apparent from a consideration of the appended specification, claims and drawing, in which Figure 1 is an elevational view of a temperature responsive device embodying my invention mounted in place adjacent the spark plug of an internal combustion engine, Figure 2 is a cross-sectional view, on an enlarged scale, of the temperature responsive device shown in Figure 1, Figure 3 is a plan view of an alternative form of mounting plate which may be used with my invention, Figure 4 is an elevational view of the mounting plate shown in Figure 3, and Figure 5 is a detailed view of a terminal member shown in cross-section in Figure 2.

Referring now to Figure 1, there is shown a spark plug 10 mounted in a conventional manner through the wall 11 of the cylinder head of an internal combustion engine. A washer 12, of usual form, is provided to secure a tight seal between the plug and the outer surface of the cylinder head.

A plate 13, having an aperture 14 (see Fig. 2) adapted to receive the threaded portion of the plug 10, is held clamped against the surface of the cylinder head by engagement of a flange portion of the plug 10 with the rim of the aperture 14. Mounted on the right hand end of the plate 13 in any suitable manner, is a generally cylindrical casing 15 having a cap 16 adapted to retain in engagement with casing 15 a terminal connection 17 on the end of an armored cable 20.

As shown in Figure 2, the plate 13 is apertured at 21 to receive a projecting portion of a core member 22 of thermally conductive material, for example, copper. The portion of core member 22 immediately above the plate 13 overlaps the edges of the aperture 21 and threadedly engages the lower portion of the casing 15.

Above the portion of core member 22 which engages casing 15, the core member 22 is provided with a vertically projecting portion 23 of substantially smaller cross-section, on which is wound a temperature responsive element 24. The element 24 may preferably be an electrical resistance element of some material having an appreciable temperature coefficient of resistance, for example, nickel. The element 24 should be suitably insulated to prevent electrical connection between it and the core member 22. Where the element 24 is used in a low voltage circuit, I have found that a double fibre covering is sufficient insulation. Where the element is used to measure high temperature, such as those present in internal combustion engines, the fibre should be of some heat resistant material, such as glass.

An insulating member 25, having a recess shaped to interfittingly engage the upper end of extension 23 of core member 22, is supported on the upper end of said extension. The insulator 25 is suitably apertured, as at 26, to permit passage of the ends of the resistance element 24 therethrough. The upper surface of the insulator 25 is provided with a central recess to receive the lower end of a spacer insulator 27. The upper surface of insulator 25 is also provided with additional recesses in opposite portions thereof, which are adapted to receive the lower ends of terminal members 30 and 31, one of which is shown in detail in Figure 5.

Another insulator member 32 is provided above the spacer 27. The lower surface of insulator 32 is suitably recessed to receive the upper end of the spacer insulator 27 and the terminal members 30 and 31. The upper surface of insulator 32 is recessed to receive the head of a screw 33, which extends downwardly through the insulators 32, 27 and 25, and threadedly engages a bore in the central part of extension 23 of core member 22. When the screw member 33 is tightened down, it serves to retain the insulators 32, 27 and 25 and the terminal members 30, 31 clamped in the position shown in Figure 2.

Referring now to Figure 5, it will be seen that the terminal piece 30 comprises a small substantially rectangular piece of metal, having a central portion 34 which has been stamped out along three sides, leaving it attached to the rest of the terminal element 30 only at its upper end. This central portion 34 is then bent out in the form of a hook to serve as a binding post on which electrical connections may be wound and soldered. Where a device is subject to high temperatures, such as in the present case, it is desirable to use silver solder or some equivalent binding material which is not adversely affected by such high temperatures.

The upper insulator 32 is provided with suitable apertures 35 to permit the passage of electrical conductors 36 which enter the casing 15 through the cable 20. The lower ends of the conductor 36 are attached to the terminal members 30 and 31, as are the ends of the resistance element 24.

All the external joints between the casing 15 and the associated parts may desirably be filled with silver solder or some equivalent material, in order to render the entire unit substantially water-proof. The use of such sealing material has been indicated at 40 at the joint between terminal connection 17 and the armored cable 20. For the sake of clarity in the drawing, the sealing material has been omitted at the other external joints of the unit.

The insulators 25 and 32 serve not only to insulate the conductors 26 and 36 from the casing 15 and core member 22, but also serve to maintain a spaced relationship between the casing 15 and the other elements of the unit, thereby providing a more rigid structure, which is highly important when a device such as this is used in connection with an internal combustion engine, which may be subject to intense vibration.

Referring now to Figures 3 and 4, there is shown an alternative form of mounting plate 41, which may be used in place of the plate 13 when the configuration of the engine upon which the temperature responsive device is to be mounted is such that a flat plate cannot be used. In some internal combustion engines, the spark plug holes are located at the bottom of wells or depressions in the outer surface of the engine. The mounting plate 41 is especially adapted for use on such engines. Plate 41 is provided with a first portion 42 apertured as at 43 to receive the threaded portion of the spark plug, and an offset portion 44, on which the casing 15 and the temperature responsive unit contained therein may be mounted. The offset portion 44 is provided with a central aperture 45 to receive the end of core member 22, and with a pair of apertures 46 to receive suitable projections (not shown) on the lower end of casing 15.

When plate 41 is used, the portion 42 fits down in the well adjacent the spark plug, while the offset portion 44 is above the surface of the engine surrounding the well.

The plate 41 is provided with flange members 47, of generally arcuate configuration, joining the edges of portions 42 and 44. These flange members 47 serve to stiffen the plate member 41 and reduce vibration of the temperature responsive unit mounted on the offset portion 44.

It will be readily understood that flanges such for example, as the flange members 47, may be used on the flat plate 13, if it is found that the flat plate alone is not sufficiently stiff to prevent undue vibration of the temperature responsive device.

While I have shown and described preferred embodiments of my invention, other modifications thereof will readily occur to those skilled in the art, and I therefore wish my invention to be limited only by the scope of the appended claims.

I claim as my invention:

1. A device for measuring the temperature of an engine having a flanged spark plug, comprising in combination, a plate of thermally conductive material having an aperture therein for receiving said plug so that said plate may be held against said engine by said flange when said plug is in place, a core member to be positioned exteriorly of said engine, said core member of thermally conductive material mounted on said plate at a point spaced from said plug, and an element having an electrical characteristic variable with temperature substantially at a predetermined rate and mounted on said core member in heat conducting relation therewith.

2. A device for measuring the temperature of an engine having a flanged spark plug comprising in combination, a plate of thermally conductive material having an aperture therein for receiving said plug so that said plate may be held against said engine by said flange when said plug is in place, a core member to be positioned exteriorly of said engine, said core member of thermally conductive material mounted on said plate at a point spaced from said plug, an element having an electrical characteristic variable with temperature substantially at a predetermined rate and mounted on said core member in heat conducting relation therewith, and a substantially water-proof housing enclosing said element.

3. A device for measuring the temperature of an engine having a flanged spark plug, comprising in combination, a plate of thermally conductive material having an apertured portion for receiving said plug so that said plate may be held against said engine by said flange when said plug is in place, said plate having an offset portion spaced from said apertured portion, and flange means joining said offset portion and said apertured portion so as to stiffen said plate, a core member to be positioned at the outer side of said engine, said core member of thermally conductive material mounted on said offset portion, and an element having an electrical characteristic variable with temperature substantially at a predetermined rate and mounted on said core member in heat conducting relation therewith.

4. A device for measuring the temperature of an engine having a flanged spark plug, comprising in combination, a plate of thermally conductive material having an apertured portion for receiving said plug so that said plate may be held against said engine by said flange when said plug is in place, said plate having an offset portion spaced from said apertured portion, a core member to be positioned at the outer side of said engine, said core member of thermally conductive material mounted on said offset portion, and an element having an electrical characteristic variable with temperature substantially at a predetermined rate and mounted on said core member in heat conducting relation therewith.

5. A device for measuring the temperature of an engine having a flanged spark plug, comprising in combination, a plate of thermally conductive material having an aperture therein for receiving said plug so that said plate may be held against said engine by said flange when said plug is in place, a core member of thermally conductive material vertically mounted on said plate at a point spaced from said plug, an element having an electrical characteristic variable with temperature substantially at a predetermined rate and mounted on said core member in heat conducting relation therewith, and electrical terminal means mounted on said core member for supporting the ends of said element.

6. A temperature responsive device, comprising in combination, an elongated core member of thermally conductive material adapted for exterior mounting with one end in heat conducting relation with a surface whose temperature is to be measured, an element having an electrical characteristic variable with temperature substantially at a predetermined rate and mounted on said core member in heat conducting relation therewith, a pair of main insulators, a spacer insulator, a pair of terminal elements, said insulators and terminal elements having interfitting surfaces, and means for clamping said insulators in stacked relation on the other end of said core member with said terminal elements and said spacer between said main insulators.

7. A temperature responsive device, comprising in combination, an elongated core member of thermally conductive material adapted for exterior mounting with one end in heat conducting relation with a surface whose temperature is to be measured, so that the heat will be conducted longitudinally through said core, an element having an electrical characteristic variable with temperature substantially at a predetermined rate and mounted on said core member in heat conducting relation therewith, a terminal assembly comprising a plurality of interfitting insulating members mounted on the other end of said core member and adapted to secure the ends of said element, and a substantially waterproof housing attached to said core member and enclosing said element and terminal assembly.

8. A temperature responsive device, comprising in combination, an elongated core member of thermally conductive material adapted for exterior mounting with one end in heat conducting relation with a surface whose temperature is to be measured, an element having an electrical characteristic variable with temperature substantially at a predetermined rate and mounted on said core member in heat conducting relation therewith, said core member having a first portion of relatively large cross-section adjacent said one end and a second portion of relatively small cross-section on which said element is mounted, a terminal assembly mounted on the other end of said core member and adapted to secure the ends of said element, and a housing attached to said first portion of said core member and enclosing said element and terminal assembly, said terminal assembly having a portion closely fitting said housing so that said housing is spaced from said element at both ends of said member.

9. A temperature responsive device, comprising in combination, an elongated core member of thermally conductive material adapted for exterior mounting with one end in heat conducting relation with a surface whose temperature is to be measured, an element having an electrical characteristic variable with temperature substantially at a predetermined rate and mounted on said core member in heat conducting relation therewith, said core member having a first portion of relatively large cross-section adjacent said one end and a second portion of relatively small cross-section on which said element is mounted, a housing attached to said first portion and enclosing said element, and means fixed on the other end of said core member and closely fitting said housing so as to maintain said housing and said element in spaced relation.

10. A device for measuring the temperature of an engine having a flanged spark plug, comprising in combination, a plate of thermally conductive material having an aperture therein for receiving said plug so that said plate may be held against said engine by said flange when said plug is in place, an elongated core member of thermally conductive material mounted with one end in heat conducting relation with said plate at a point spaced from said plug, an element having an electrical characteristic variable with temperature substantially at a predetermined rate and mounted on said core member in heat conducting relation therewith, said core member having a first portion of relatively large cross-section adjacent said one end and a second portion of relatively small cross-section on which said element is mounted, a housing attached to said first portion and enclosing said element, and means fixed on the other end of said core member and closely fitting said housing so as to maintain said housing and said element in spaced relation.

11. A device for measuring the temperature of an engine having a flanged spark plug, comprising in combination, a plate of thermally conductive material having an aperture therein for receiving said plug so that said plate may be held against said engine by said flange when said plug is in place, a core member of thermally conductive material to be positioned exteriorly of said engine, said core member mounted vertically on said plate at a point spaced from said plug, flange means for stiffening said plate so as to reduce relative vibration of the apertured portion of the plate and the portion on which the core member is mounted, and an element having an electrical characteristic variable with temperature substantially at a predetermined rate and mounted on said core member in heat conducting relation therewith.

12. A device for measuring the temperature of an engine, comprising, in combination, an elongated core member of thermally conductive material to be positioned exteriorly of said engine, a plate for mounting one end of said core member in heat conducting relation with an engine surface whose temperature is to be measured, an element having an electrical characteristic variable with temperature substantially at a predetermined rate, said element mounted on said core member in heat conducting relation therewith, a terminal assembly mounted on the other end of said core member and adapted to secure the ends of said element, and a substantially water-proof housing attached to said core member and enclosing said element and terminal assembly.

13. Means for measuring the internal temperature of an internal combustion engine comprising in combination, an ignition plug for said engine extending through the engine wall thereof, a plate formed of thermally conductive material, a first portion of said plate secured by said plug in contacting relation with said plug and an immediately adjacent portion of said engine wall and in heat conducting relation therewith, a second portion of said plate extending to one side of said plug, an electrical resistance winding, the resistance of said winding variable in response to temperature change substantially at a predetermined rate, means mounting said winding exteriorly of said engine, said means mounting said winding upon said second portion of said plate at one side of said plug and in heat conducting relation with said plate, said winding arranged in such a manner that the resistance thereof is substantially effected through said plate by the temperature existing at said plug, whereby the internal temperature of said engine may be determined.

14. Means for measuring the internal temperature of a combustion engine comprising in combination, an ignition plug for said engine, a plate formed of thermally conductive material, one portion of said plate positioned in contact with said plug and in heat conducting relation therewith, a temperature responsive resistance winding mounted exteriorly of said engine, another portion of said plate positioned to the side of said plug, said winding supported by said other portion of said plate and said winding in heat conducting relation therewith in such a manner that the resistance of said winding is substantially effected by the temperature existing at said plug whereby the internal temperature of said engine may be determined.

15. A device of the character described, comprising, in combination, an elongated core member, said core being adapted for exterior mounting and having a portion of relatively large cross section adjacent one end and in direct heat transfer relationship with an exterior surface whose temperature is to be measured, an element having an electrical characteristic variable with temperature substantially at a predetermined rate, said element mounted on said core member, a pair of main insulators, a pair of elongated terminal elements, said insulators and terminal elements having interfitting surfaces, and means for clamping said insulators in stacked relation on said core member with said terminal elements extending longitudinally between said main insulators.

RAYMOND P. MATTERN.